(12) United States Patent
Young et al.

(10) Patent No.: US 12,062,055 B2
(45) Date of Patent: Aug. 13, 2024

(54) SYSTEMS AND METHODS FOR INCREASING DATA SECURITY IN SOCIAL MEDIA ONLINE PLATFORMS

(71) Applicant: Bank of America Corporation, Charlotte, NC (US)

(72) Inventors: Michael Young, Davidson, NC (US); Vinesh Patel, London (GB); Melissa Gordon Glenn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 420 days.

(21) Appl. No.: 17/683,475

(22) Filed: Mar. 1, 2022

(65) Prior Publication Data
US 2023/0281641 A1    Sep. 7, 2023

(51) Int. Cl.
| | |
|---|---|
| G06Q 10/00 | (2023.01) |
| G06F 16/951 | (2019.01) |
| G06Q 30/018 | (2023.01) |
| H04L 9/40 | (2022.01) |
| G06Q 50/00 | (2012.01) |

(52) U.S. Cl.
CPC ....... G06Q 30/0185 (2013.01); G06F 16/951 (2019.01); H04L 63/1483 (2013.01); *G06Q 50/01* (2013.01)

(58) Field of Classification Search
CPC . G06Q 30/0185; G06Q 50/01; H04L 63/1483
See application file for complete search history.

(56) References Cited

U.S. PATENT DOCUMENTS

| | | | |
|---|---|---|---|
| 8,688,701 B2 | 4/2014 | Ghosh et al. | |
| 9,870,465 B1 * | 1/2018 | Levi | ............ H04L 67/306 |
| 10,673,887 B2 | 6/2020 | Crabtree et al. | |

(Continued)

FOREIGN PATENT DOCUMENTS

EP        2545680 B1 *    8/2022    ......... H04L 63/1425

OTHER PUBLICATIONS

Cloud Optik Launched SmartProfile List and Enrich to Help Channel Partners Optimize Customer Sales Data to Drive Revenue. ICT Monitor Worldwide [Amman] Sep. 26, 2018 (Year: 2018).*

(Continued)

Primary Examiner — Gabrielle A McCormick
(74) Attorney, Agent, or Firm — Weiss & Arons LLP (57) ABSTRACT

Methods for increasing a data security of information shared and viewed within a social network platform is provided. Methods may include generating a social media impersonation score ("SMIS") for a first user account on the social network platform. The SMIS may indicate a veracity of the user profile data associated with the first user account. Methods may include verifying the veracity of the user profile data by determining an authenticity of a corporate email address associated with the first user account. Methods may include determining that the corporate email address exists and verifying that a domain associated with the corporate email address is a trusted domain. Methods may include generating the SMIS based on results of the verifying and linking the SMIS to the first user account. Methods may further include displaying the first user account and the SMIS on a graphical user interface ("GUI") of the social network platform.

20 Claims, 9 Drawing Sheets

(56) References Cited

U.S. PATENT DOCUMENTS

| | | |
|---|---|---|
| 2018/0189872 A1 | 7/2018 | Bhattacharjee et al. |
| 2019/0132333 A1* | 5/2019 | Kirkham ............... H04L 63/126 |
| 2020/0092257 A1* | 3/2020 | Goldstein ............... H04L 67/02 |
| 2020/0280565 A1* | 9/2020 | Rogynskyy ............ G06N 20/00 |
| 2021/0264006 A1* | 8/2021 | VanBlon ................. G06F 21/45 |
| 2022/0255942 A1* | 8/2022 | Szigeti ................. H04L 63/102 |

OTHER PUBLICATIONS

"What Is Two Factor Authentication?" https://authy.com/what-is-2fa/, Twilio, Inc., Retrieved on Feb. 7, 2022.

Ryan Detert, "Bot or Not: Seven Ways to Detect an Online Bot," https://www.forbes.com/sites/forbesagencycouncil/2018/08/06/bot-or-not-seven-ways-to-detect-an-online-bot/?sh=7ba5f3bc7fba, Aug. 6, 2018.

\* cited by examiner

SYSTEMS AND METHODS FOR INCREASING DATA SECURITY IN SOCIAL MEDIA ONLINE PLATFORMS

FIELD OF TECHNOLOGY

Aspects of the disclosure relate to enhancing data security in a social media network. Specifically, aspects of the disclosure relate to enhancing data security based at least in part on a data security score associated with a user of the social media network.

BACKGROUND OF THE DISCLOSURE

Social media websites provide users with a unique ability to make connections with individuals and share and learn from others behaviors. Social media websites have become an integral part of many people's social and business lives, as they are used to build and maintain friendships in addition to advertising and marketing.

Because of the many opportunities available through social media websites, there has been a significant increase in users creating and maintaining fake social media accounts. These fake accounts may be used for personal or business purposes, with the intent of scamming unsuspecting individuals into undesirable social or business relationships.

Many fraudulent social media accounts impersonate real and existing accounts. The images and graphics used in the profile of a fraudulent account may be the same or very similar to images and graphics of authentic businesses. Additionally, a domain name and/or an email address listed on the fraudulent account may be almost identical to a trusted domain. A company description may also be identical to a description of a real corporation, organization and/or company.

To protect authentic social media account users from falling victim to scammers, and to further protect the data included in authentic social media accounts users from being viewed by scammers, it would be desirable to increase data security of information associated with each account by authenticating and verifying the data.

SUMMARY OF THE DISCLOSURE

A method for increasing a data security of information shared and viewed within a social network platform is provided. The method may include receiving a request to create a first user account on the social network platform. The request may include user profile data associated with a first user. The user profile data may include a first name, a last name, a username and a password. The user profile data may also include an email address and additional contact information.

The method may include creating the first user account based on the user profile data.

The method may further include transmitting a communication to the first user. The communication may include an option to generate a social media impersonation score ("SMIS"). The SMIS may be linked to the first user account. The SMIS may indicate a veracity of the user profile data.

In response to a receipt of acceptance to generate the SMIS, the method may include verifying the veracity of the user profile data. The verifying may include determining an authenticity of a corporate email address associated with the first user account. The determining may include confirming that the corporate email address is authentic. The determining may also include verifying that a domain associated with the corporate email address is a trusted domain.

The method may also include executing a two-factor authentication on the first user account. The two-factor authentication may preferably use the corporate email address for authentication.

The method may also include generating the SMIS based on results of the verifying.

The method may further include linking the SMIS to the first user account. When the first user account is displayed on a graphical user interface ("GUI") of the social network platform, the SMIS may also be displayed on the GUI.

Based on the SMIS, the method may include filtering data associated with a second user account being displayed to the first user.

The filtering may include, when the SMIS is equal to or above a pre-determined threshold value, displaying second user account profile data on the GUI. The second user account profile data may include a first subset of information and a second subset of information. The first subset of information may include non-sensitive data. The second subset of information may include sensitive data.

The filtering may include, when the SMIS is below the pre-determined threshold value, displaying on the GUI the first subset of information and masking the second subset of information.

The filtering may further include, when the SMIS is less than a minimum pre-determined threshold value, blocking any access or selected access to the GUI.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A system for increasing the data security of information shared and viewed within a social network platform is provided. The system may include a computing device. The computing device may host the social network platform. The computing device may include a processor and memory.

The system may include an account manager tool. The account manager tool may include a first set of computer programmable instructions stored in the memory of the computing device. The account manager tool, when executed by the processor may be configured to receive a request to create a first user account on the social network platform. The request may include user profile data associated with a first user. The user profile data may include a first name, a last name, a username and a password. The user profile data may also include a personal email address. The user profile data may also include a corporate email address.

The account manager tool may also be configured to transmit a communication to the first user. The communication may include an option to generate an SMIS. The SMIS may be linked to the first user account. The SMIS may indicate a veracity of the user profile data. The SMIS may use one or more factors described herein to rank the probability that a user profile is an authentic user profile. A high SMIS may be correlated with a high probability that a user profile is an authentic user profile. Conversely, a low SMIS may be correlated with a low probability that a user profile is authentic. As described below, action may be taken for social media account users associated with a user account with a low SMIS as a preventative measure to increase the security of data displayed within the social network platform.

The communication may be an electronic communication such as an email. The communication may be displayed as an alert on a user interface ("UI") of a mobile device. The communication may be displayed as a selectable option on a graphical user interface ("GUI") generated by the social network platform.

The account manager tool may be further configured to receive a communication from the first user account to generate the SMIS.

In some embodiments, the communication may include an acceptance to opt-in to generate the SMIS.

In some embodiments, the communication may include an opting-out of generating the SMIS. When the user does not want the SMIS generated and linked to the user's profile account, the request to create the first user account is complete.

When the communication includes the acceptance to generate the SMIS, an account validator tool may be executed. The account validator tool may include a second set of computer programmable instructions stored in the memory of the computing device. When executed by the processor, the account validator tool may be configured to, in response to a receipt of the acceptance communication, verify the veracity of the user profile data.

The verifying may include determining an authenticity of a corporate email address associated with the first user account. The determining of the authenticity of the corporate email address may include confirming that the corporate email address is authentic. The corporate email address may be determined to be authentic by determining that the corporate email address exists. In some embodiments, this may be determined by the account manager tool. In some embodiments, the system may utilize third-party applications for verification, such as emailchecker.net, GoDaddy.com, or any other suitable third-party application.

The determination of the authenticity of the corporate email address may include verifying that a domain associated with the corporate email address is a trusted domain. The domain of the corporate email address may be determined to be a trusted domain using a third-party application as described above.

The verifying may also include executing a two-factor authentication on the first user of the first user account. The two-factor authentication may use the corporate email address for authentication. The two-factor authentication may combine user biometrics and the corporate email address for authentication.

In some embodiments, the two-factor authentication may include a first-factor authentication including input of a password. The two-factor authentication may include receiving a one-time passcode via an electronic communication from the domain associated with the corporate email address. The one-time passcode may be inputted at the first user account. In response to the confirming, via the social network platform, the one-time passcode with the domain, the first user account may be verified.

When a corporate account is a corporate account of a company that has a plurality of user accounts within the social network platform, the social network platform may compare corporate account data to the plurality of corporate account data already stored on the social network platform. For example, the social network platform may include 1,000 corporate accounts for CompanyA. The social network platform may determine that 99% of these corporate accounts are associated with a corporate email address ending in '.CompanyA." This data may then be compared to the corporate account being created. If the corporate account being created lists a corporate email address having a domain name different from'.CompanyA', this data may be added into the calculation of the SMIS and result in a low SMIS.

The level of verification of each of the steps of authentication may enable an increase or decrease to the SMIS.

The verifying of the veracity of the first user profile data may further include receiving one or more personally identifiable documents electronically from the first user and verifying an authenticity of the one or more personally identifiable documents. The one or more personally identifiable documents may include one or more of a passport, driver's license and social security number. The system may be enabled to authenticate the one or more personally identifiable documents and either increase or decrease the score.

The verifying of the veracity of the first user profile data may also include determining if the user of the user account is a robot ("BOT"). For example, the account validator tool may use one or more of the following account characteristics to determine if the user account is a BOT: unusual spike in post activity, a response to a post which is quicker than a human response time, a large number of likes relative to a small number of comments and/or a user's followers having similar bios/names/pictures. The SMIS may be increased or decreased based on the determining whether the bot is a good bot or a bad bot.

The SMIS may be increased or decreased. There may be additional searches that the account validator tool may perform to obtain either an increase or decrease to the SMIS. The account validator tool may search additional social media accounts associated with the first user and monitor the level of activity occurring in the additional social media accounts.

If the first user has many followers, this may be an indication that the first user is valid and may increase the score. If the first user has little or no followers on the additional social media accounts associated with the first user, this may be questionable. The account validator tool may first check an account creation date. If the account creation date is greater than or equal to a pre-determined number of days and the user has a minimal number of followers or no followers, this may cause a decrease to the SMIS. If the account creation date is greater than or equal to the pre-determined number of days and the user has many followers, this may cause an increase to the SMIS.

The account validator tool may also search metadata associated with online news reports. For example, if an account user claims to be a company CEO on a social media account the account validator tool may search metadata to determine if a user name appears in one or more online news reports in association with the company CEO. If it does, the account validator tool may use this determination as a factor to increase the SMIS. If an account user claims to be a company CEO on a social media account, but the account validator tool does not retrieve one online article citing the account user's name and alleged company, the account validator may use this data to decrease the SMIS.

Additionally, the account validator tool may compare a corporate email address of the first user to other corporate email addresses associated with the same domain. For example, when a user claims to be associated with corporation 'X' and provides the user's corporate email address, the account validator tool may search the corporate website to identify, internally, corporate email addresses of other employees. If the domain provided by the first user matches the domain of the other employees, this may be an indication that the corporate email address is valid. If the domain of the corporate email addresses provided by the first user is similar but slightly different, this may be an indication that the corporate email address provided by the first user is invalid.

The account validator tool may be further configured to generate the SMIS based on results of the verifying. The SMIS may be equal to a value ranging from zero to one hundred. The SMIS may be equal to zero. The SMIS may be equal to 100.

The SMIS may be a sum of resultant scores generated for some or all of the verifying steps described above. For example, the SMIS may be a summation of scores generated for each of: a response by a user to the two-factor authentication, the determination whether the user's email address is a real email address, the determination of whether the user's domain associated with the user's email address is a trusted domain, and any other of the steps described herein. In some embodiments, a first verifying step may be assigned a larger weight than a second verifying step. For example, the response by the user to the two-factor authentication may be 50% of the SMIS, the determination of whether the email address real may be assigned 30% of the SMIS, and the determination of whether the email address is a trusted domain may be assigned 20% of the SMIS. When additional verifying steps are added, the percentages may be shifted to include the results of the one or more additional verifying steps.

In exemplary embodiments, the response of a user to the two-factor authentication prompt may give the user a 100% score for this step (which is then assigned the corresponding weight in the SMIS). Failure of the user to respond to the two-factor authentication may give the user a 0% score for this step. Additionally, a fake e-mail address/trusted domain address may give a 0% score and an authenticated e-mail address/authenticated domain address may give an 100% score.

The account manager tool may be configured to link the SMIS to the first user account. When the first user account is displayed on a graphical user interface ("GUI") of the social network platform, the SMIS may also be displayed on the GUI. When user's of the social network platform may browse user accounts, the SMIS may be displayed alongside the profile of user accounts that may opt-in to generate an SMIS.

The linking of the SMIS to the first user account may further include linking the SMIS to each email communication transmitted from the first user account by displaying the SMIS in the body of the email communication. An SMIS icon may be displayed along with the value of the score. Each recipient of the email communication may be able to view the SMIS icon and the value of the score within the body of the email.

Systems and methods described herein may be implemented into online platforms different from social media platforms. For example, online websites selling goods or services may use the systems and methods described herein. In some of these embodiments, a seller may be presented with an option to have a SMIS generated to rate the seller's validity. Additionally, the systems and methods described herein may be used for an online user providing an online review. In some of these embodiments, the reviewer may be presented with the option of having the SMIS generated for the reviewer's review.

The system may include an account filtering tool. The account filtering tool may include a third set of computer programmable instructions stored in the memory of the computing device. The account filtering tool, when executed by the processor, may be configured to filter data associated with a second user account being displayed to the first user. The filtering may be based on the SMIS of the first user account.

The filtering may include, when the SMIS is equal to or above a pre-determined threshold value, displaying second user account profile data on the GUI. The second user account profile data may include a first subset of information and a second subset of information. The first subset of information may include non-sensitive data and the second subset of information may include sensitive data.

Sensitive data may include a personal home address, an email address, an image of a user and/or hyperlinks to one or more additional personal social media platforms associated with the user.

Non-sensitive data may include, but may not be limited to, a first and last name, a title and place of employment.

The filtering may include, when the SMIS is below the pre-determined threshold value, displaying on the GUI the first subset of information and masking the second subset of information.

The filtering may include, when the SMIS is less than a minimum pre-determined threshold value, blocking access to the GUI.

The system may execute the account validator tool to update the SMIS in real-time. The updating in real-time may include executing a web crawler for crawling weblinks on webpages of the domain. In response to the crawling, the web crawler may extract data from the weblinks. The system may be configured to verify an authenticity of the first user's account by verifying the extracted data. Based on the verifying, the system may be configured to update the SMIS to reflect the authenticity of the first user account.

It is very common for users to display links on the account page that may be associated with blogs that may be personal and/or related to the user. The links may be associated with additional accounts and websites the user may be involved with. The links may be linked to additional websites the user may show interest in.

The web crawler may extract relevant data from these weblinks that may enable further verification of the user associated with the first user account.

A method for increasing a data security of information shared and viewed within a social network platform is provided. The method may include receiving a request to create a first user account on the social network platform. The request may include user profile data associated with a first user. In response to the receipt of the user profile data, the method may include creating the first user account.

The method may further include transmitting a communication to the first user. The communication may include an option to generate a SMIS. The SMIS may be linked to the first user account. The SMIS may indicate a veracity of the user profile data.

In response to a receipt of acceptance to generate the SMIS, the method may include verifying the veracity of the user profile data. The verifying may include determining an authenticity of a corporate email address associated with the first user account.

The verifying may include determining that the corporate email address exists and verifying that a domain associated with the corporate email address is a trusted domain.

The verifying may also include executing a two-factor authentication on a first user of the first user account. The two-factor authentication may use the corporate email address for authentication.

Following verification, the method may include generating the SMIS based on results of the verifying.

The method may further include linking the SMIS to the first user account. When the first user account is displayed on a graphical user interface ("GUI") of the social network platform, the SMIS may also be displayed on the GUI.

Based on the SMIS, the method may include filtering data received from a second user account to the first user account. The filtering may include, when a communication is being transmitted from the second user account to the first user account, checking the SMIS prior to completing a transmission.

The filtering may include, the SMIS is at or above a pre-determined threshold value, transmitting the communication directly to the first user account.

The filtering may also include, when the SMIS is below the pre-determined threshold value, filtering the communication to identify sensitive data included in the communication. When sensitive data is identified, the filtering may include masking the sensitive data and then transmitting the communication to the first user account. The communication may include the masked sensitive data. Following the transmission, the method may include notifying the second user account of the masking.

The sensitive data may include but may not be limited to an email address, a personal home address and a personal contact phone number.

The method may further include, in response to a request from the second user account to unmask the sensitive data, unmasking the sensitive data and resending the communication to the first user account.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
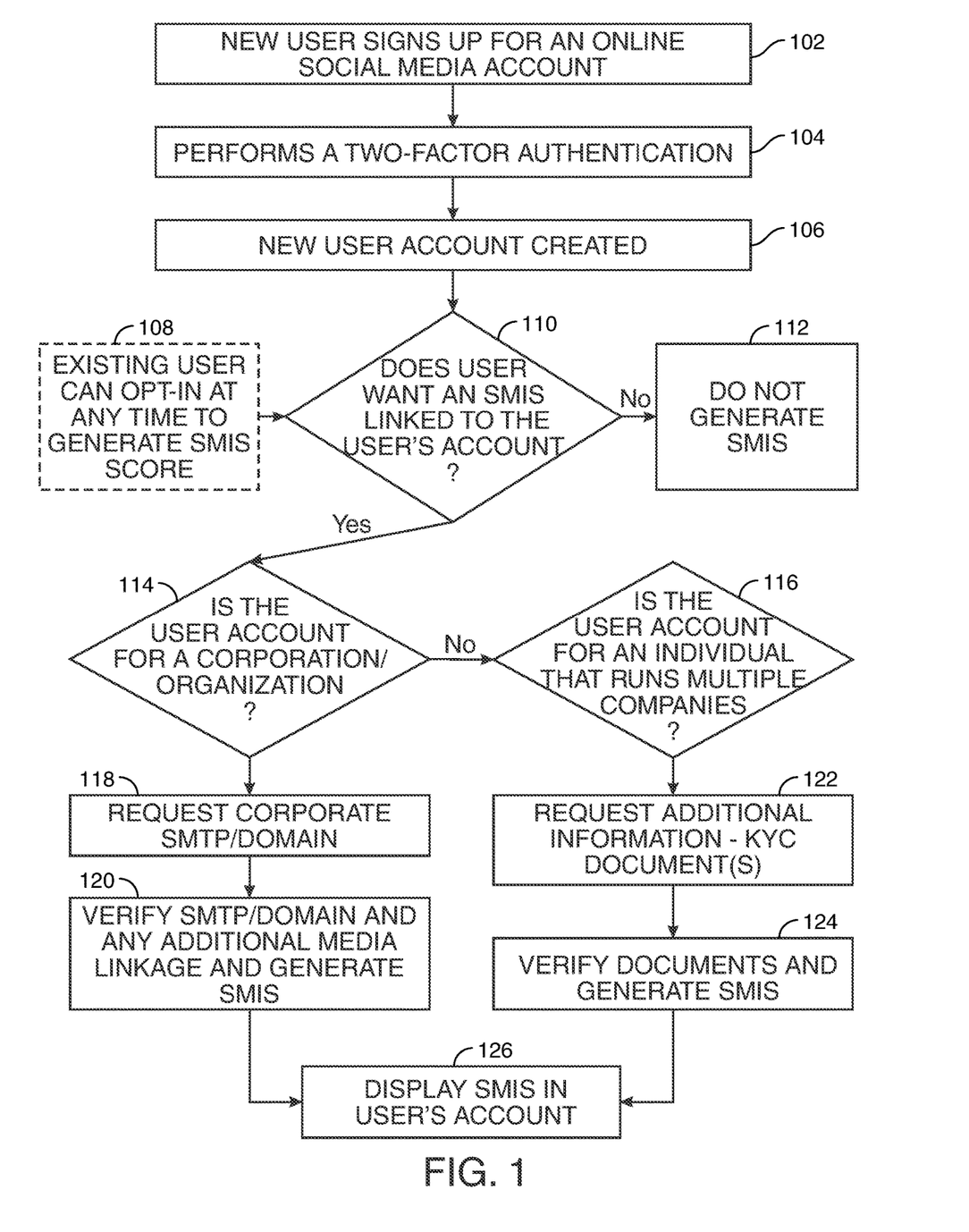
FIG. 1 shows an illustrative flow chart in accordance with principles of the disclosure.

FIG. 1 shows an illustrative flow chart in accordance with principles of the disclosure. At step 102, a new user signs up for an online social media account. At step 104, a two-factor authentication is performed. The two-factor authentication may be initiated and set up prior to creating the new user account.

The new user may input a username and password. This may be the first level of authentication. The new user may be prompted to input a second factor of authentication. The second factor of authentication may be a biometric characteristic, i.e. —iris recognition, fingerprint. The second factor of authentication may be a secret question unique to the new user. The second factor of authentication may be a one-time passcode. The one-time passcode may be transmitted to an email address provided by the new user.

Following the initiation of the two-factor authentication, at step 106 the new user account is created. This two-factor authentication may authenticate the user to the social media account.

Once the new user has an account set up, the system may prompt the user to generate an SMIS that may be linked to the user's account. If the user opts-out of selecting to generate the SMIS, the SMIS will not be generated and the user account may remain open, as shown at step 112.

When the new user prefers to opt-in to generate the SMIS as shown at 110, the system may determine if the new user account is an account associated with a corporation and/or organization, as shown at step 114. When the user account is a corporation or organization, the system may request a Simple Mail Transfer Protocol ("SMTP") or domain associated with the corporation or organization, as shown at step 118. The SMTP or domain may be identified by the corporate email address of the new user.

At step 120 the system may verify the SMTP. The system may verify the domain to be a trusted domain. The system may also crawl for any additional media linkage associated with the new user and verify the security and accuracy of the additional media linkage. This may be links on the user's account linking to additional accounts associated with the user. The links may be linked to additional websites, blogs and articles the user may be associated with. In response to the verification, the SMIS may be generated.

At step 126, the system may display the SMIS in the user's account.

At step 114, if the user account is not associated with a corporation and/or organization, step 116 may be performed. At step 116, the system may determine if the new user account is for an individual that runs multiple companies. This may be determined by identifying multiple corporate email addresses associated with different domains. If the new account is for an individual that runs multiple companies, at step 122, the system may request additional information to verify the individual. The additional information may be 'know your customer' ("KYC") type documents. KYC documents may include, but may not be limited to, a driver's license, passport and social security number.

At step 124, the system may verify the one or more KYC documents and generate the SMIS based on the verification. Following verification, at step 126 the system may display the SMIS in the user's account.

It should be appreciated that when the user's account is not a newly created account but may already exist in the system, the user may select to opt-in to generate the SMIS at any time, as shown at 108.

Figure 2:
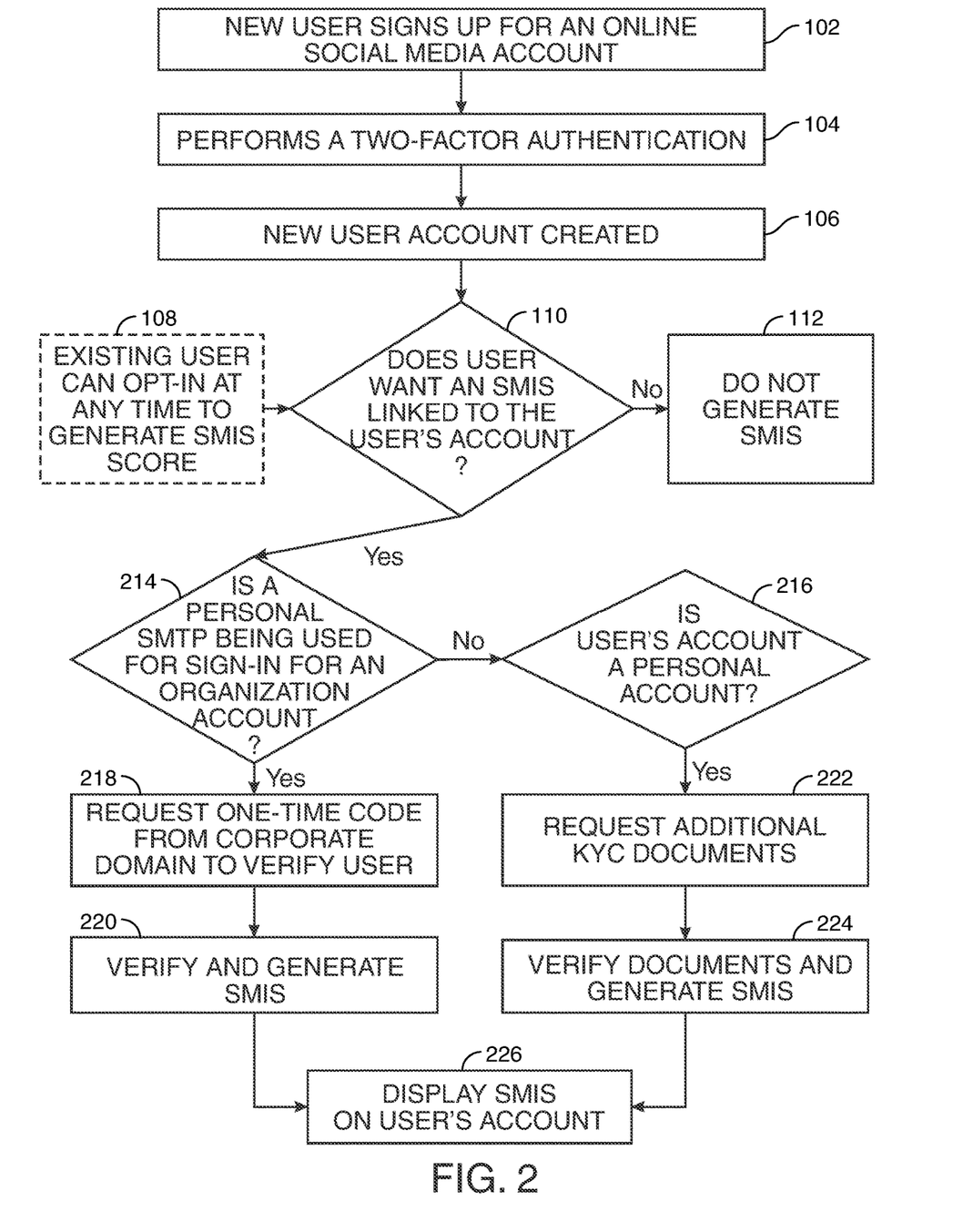
FIG. 2 shows an illustrative flow chart in accordance with principles of the disclosure.

FIG. 2 shows an illustrative flow chart in accordance with principles of the disclosure. The illustrative method shown in the flow chart may include one or more of steps 102-112, described in detail above.

In the event that decisioning processes are executed which determine that neither of conditions 114 and 116 are met, the methods may include executing decisioning process 214.

At step 214, the system may determine if the user is using a personal SMTP for signing-in to an organization account. The system may determine if the user is using a personal SMTP for a personal account but may be associated with a corporation and have a corporate email address.

When the user is using a personal SMTP but may be associated with a corporation, the system may request a one-time passcode from the corporate domain in order to verify the user, as shown at step 218. The system may receive the one-time passcode from the corporate domain. The corporate domain may send the one-time passcode to the user's email address.

The user may input the one-time passcode and the system may verify the one-time passcode, as shown at 220. This verification may authenticate the user. The SMIS may be generated based on the authentication.

At step 226, the system may display the SMIS in the user's account.

At step 214, when the user is determined not to be associated with a corporation, the system may determine if the user's account is a personal stand-alone account and not associated with a corporation, as shown at 216.

When the user's account is a personal account, the system may request additional KYC documents to verify the user, as shown at 222. The system may receive one or more documents and verify the documents. Based on the verification, the system may generate an SMIS, as shown at 224. When the documents are not valid, the system may output a score of '0'. When the documents are valid, the system may output a score of '100.' In some embodiments, the documents may be valid but may include additional information that may either increase or decrease the score.

Following the generating of the SMIS, the system may display the SMIS on the user's account, as shown at 226.

Figure 3:
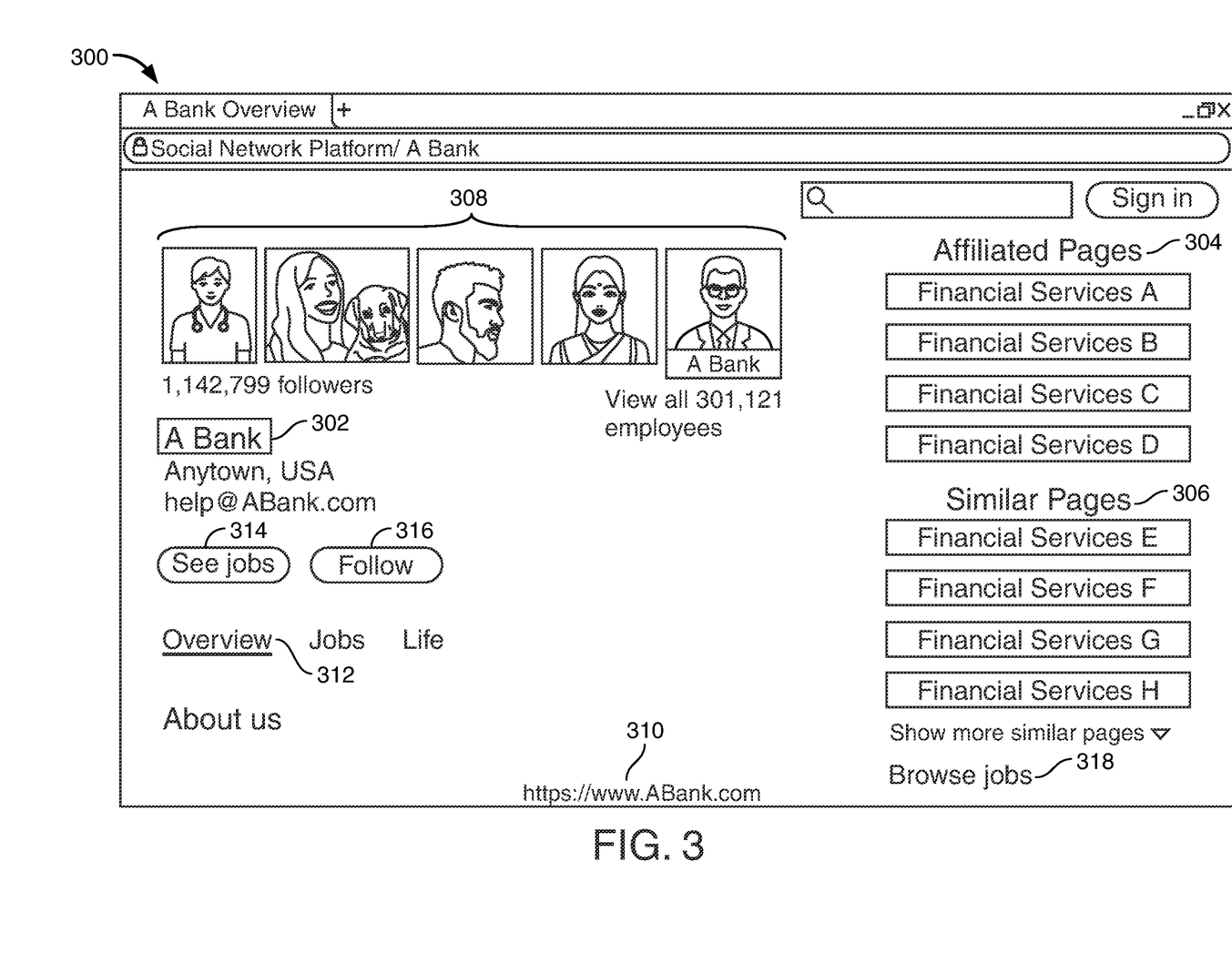
FIG. 3 shows an illustrative diagram in accordance with principles of the disclosure.

FIG. 3 shows illustrative user account 300. User account 300 may be a user account of a corporation. In FIG. 3, the corporation is A Bank 302. User account 300 may display one or more of Affiliated Pages 304 and Similar Pages 306. Affiliated Pages 304 may be social media account pages affiliated with A Bank 302. Similar Pages 306 may be social media account pages affiliated with A Bank 302.

User account 300 may additionally display one or more photographs of followers 308. Followers 308 may be individuals who follow A Bank 302.

User account 300 may display one or more pieces of information related to A Bank 302, such as an address, phone number, e-mail address, or any other suitable information. Email address 310 may be an e-mail address of A Bank 203 displayed on user account 300. Email address 310, when selected, may re-direct a user to a webpage of email address 310.

User account 300 may also display one or more selectable options. The selectable options, when selected, may trigger the displaying of a different display to a user viewing user account 300. Exemplary selectable options may include Overview 312, See jobs 314, Follow 316, Browse jobs 318, and any other suitable selectable options.

User account 300 does not include an SMIS icon. The user of user account 300, when setting up user account 300, may have not selected an option to have SMIS calculated and displayed as described herein.

Figure 4:
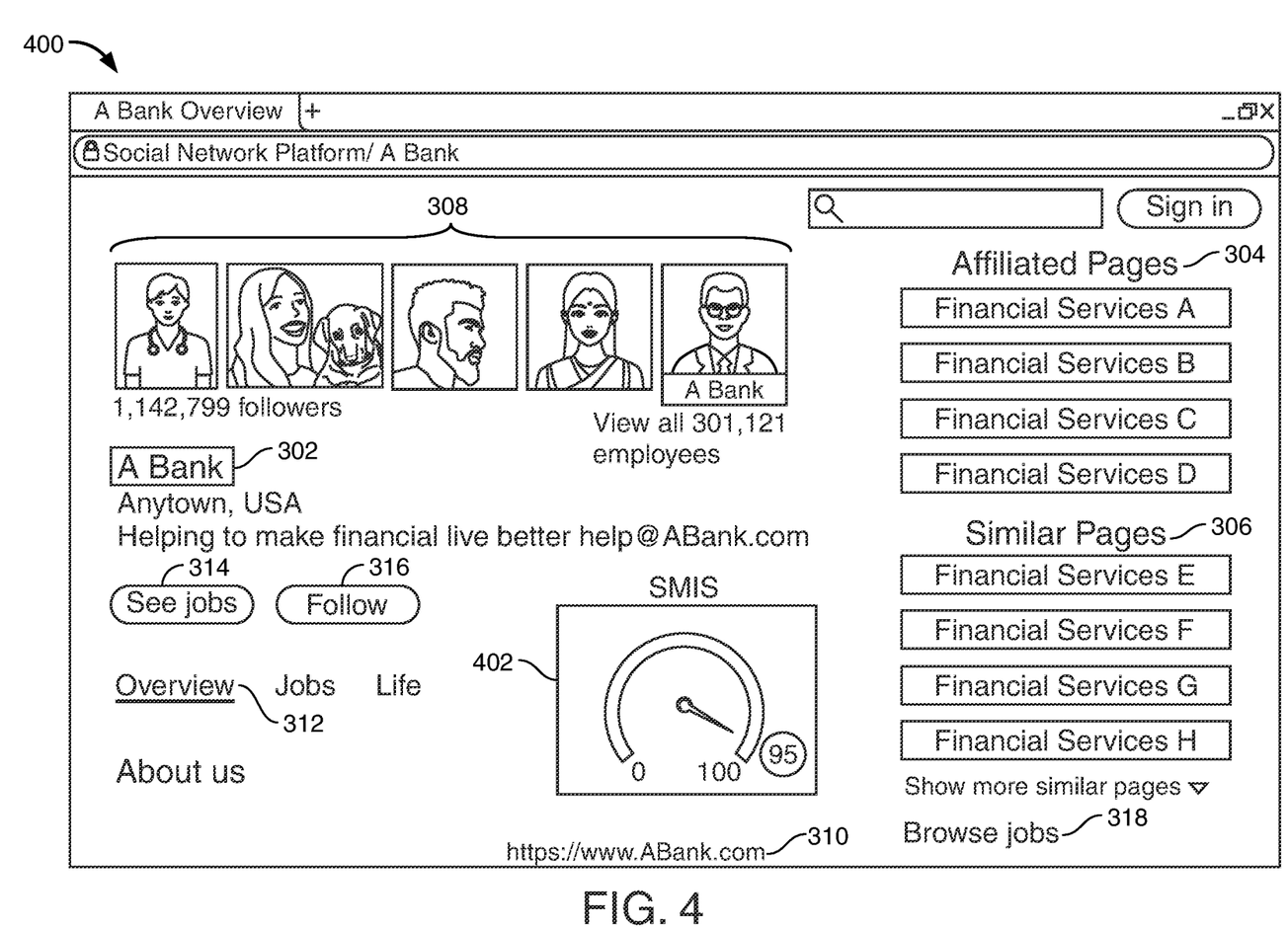
FIG. 4 shows an illustrative diagram in accordance with principles of the disclosure.

FIG. 4 shows illustrative user account 400. User account 400 may include one or more features illustrated in FIG. 3. User account 400 may also include SMIS icon 402. In FIG. 4, SMIS icon 402 displays a score of 95. Score 95 may be calculated as described herein. User account 400 may display SMIS icon 402 in response to a selection, by a user operating A Bank 302's corporate account, to calculate and display SMIS icon 402. Score 95 may be a high SMIS.

Figure 5:
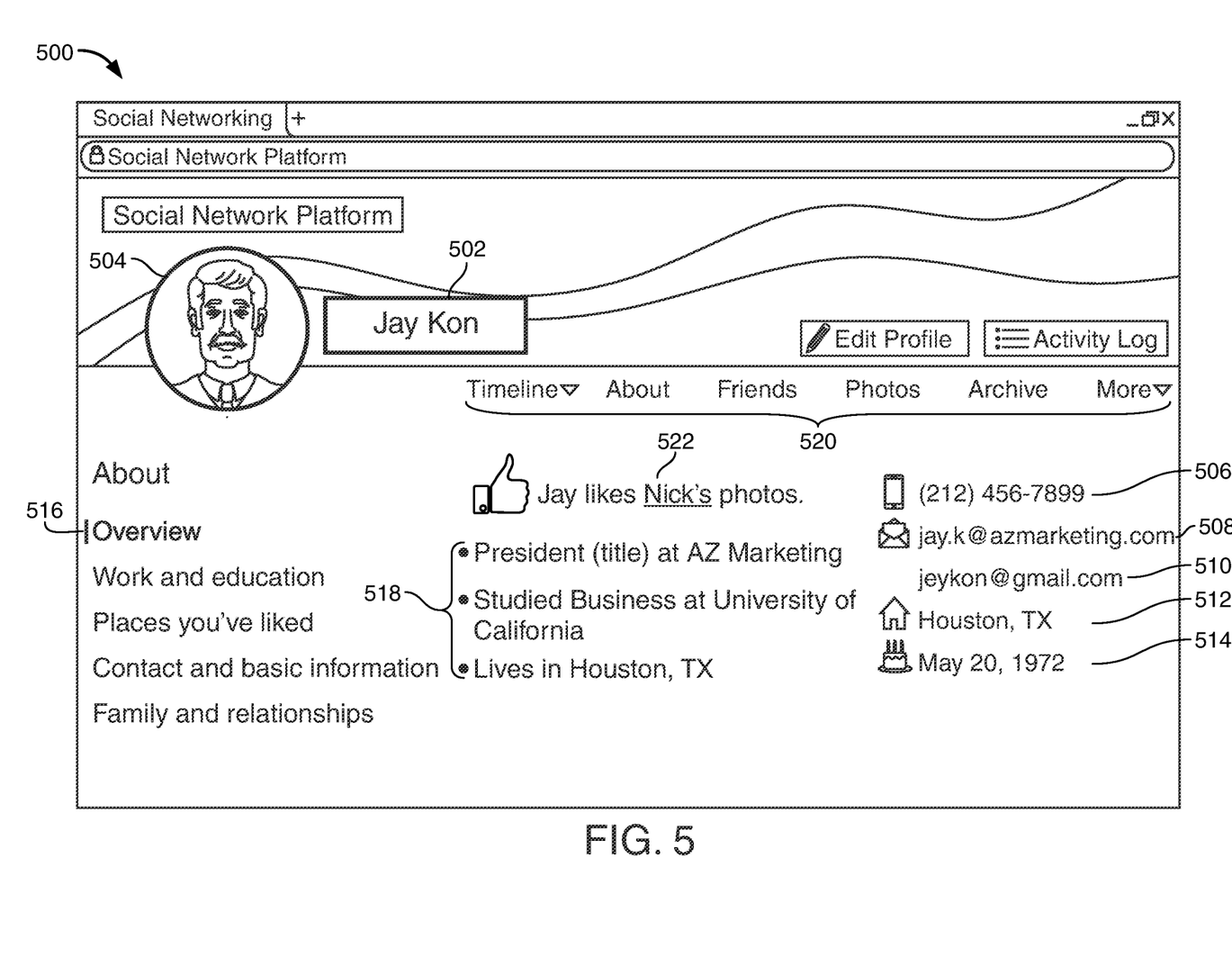
FIG. 5 shows an illustrative diagram in accordance with principles of the disclosure.

FIG. 5 shows illustrative user account 500. User account 500 may be a user account of user Jay Kon. The name of the user may be displayed in text box 502. User account 500 may include photo 504 of the user.

User account 500 may also display personal information relating to the user. The personal information may include one or more of phone number 506, corporate e-mail address 508, personal e-mail address 510, city and state of residence 512, date of birth 514 and overview 518. Some or all of the aforementioned personal information may be included in the first subset of information comprising non-sensitive data. Some or all of the aforementioned personal information may be included in the second subset of information comprising sensitive data.

In FIG. 5, selectable tab Overview 516 has been selected, and, as a result, overview 518 information is displayed. Selection of a different selectable tab, such as Work and Education tab, Places you've liked tab, Contact and basic information tab, and/or Family and relationships tab may display different information relating to the user of user account 500.

User account 500 may include additional selectable tabs 520. Selection of one of selectable tabs 520 may display information relating to the user of user account 500.

User account 500 does not include an SMIS icon. The user of user account 500, when setting up user account 500, may have not selected an option to have SMIS calculated and displayed as described herein.

Figure 6:
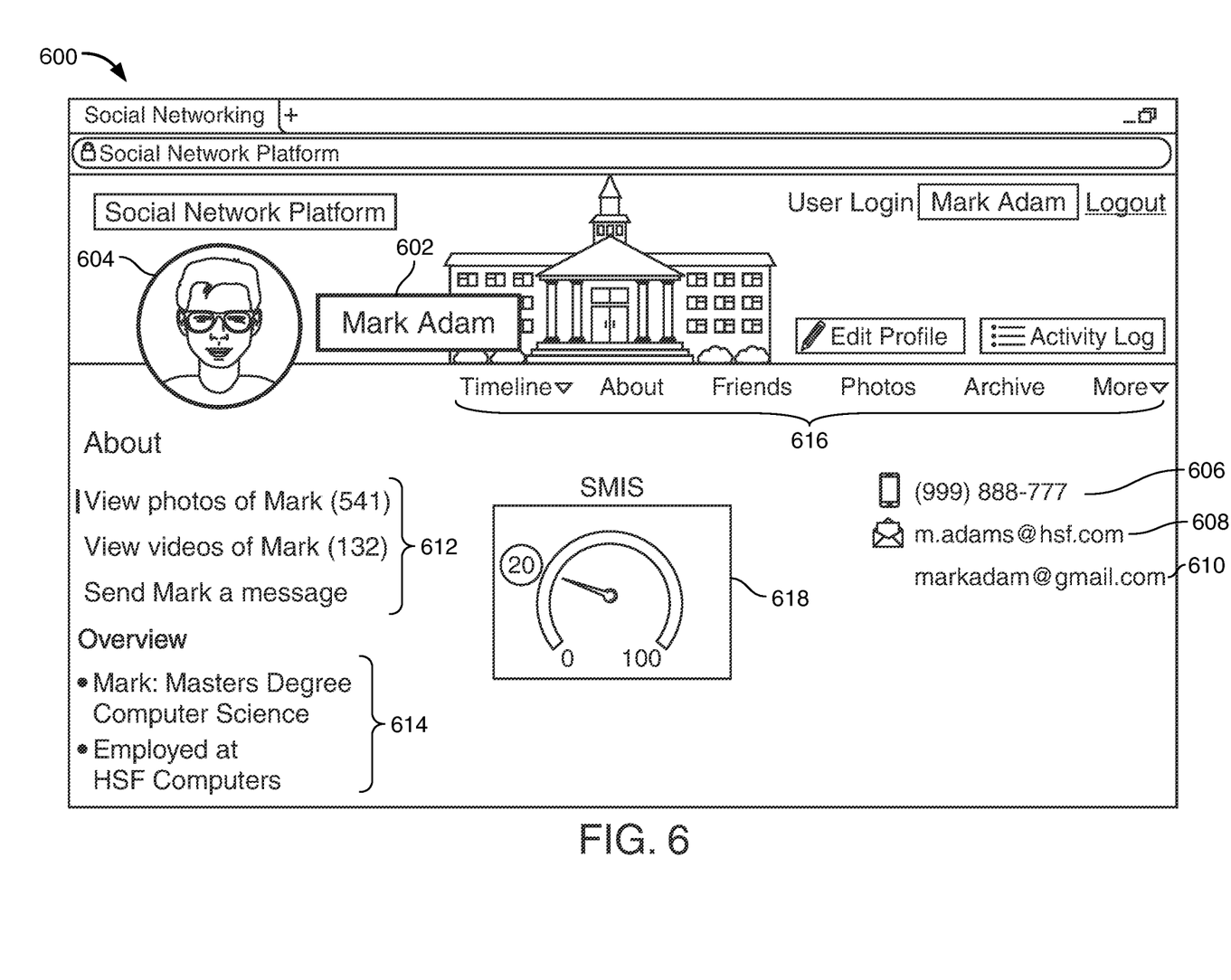
FIG. 6 shows an illustrative diagram in accordance with principles of the disclosure.

FIG. 6 shows illustrative user account 600. User account 600 may be a user account of user Mark Adam. The name of the user may be displayed in text box 602. User account 600 may include photo 604 of the user.

User account 600 may also display personal information relating to the user. The personal information may include one or more of phone number 606, corporate e-mail address 608 and personal e-mail address 610. User account 600 may also display selectable tabs 616 and selectable options 612 which, when selected, may display additional information relating to the user. Some or all of the aforementioned information may be included in the first subset of information comprising non-sensitive data. Some or all of the aforementioned information may be included in the second subset of information comprising sensitive data.

User account 600 may also display information 614 showing an overview of the user's work history.

User account 600 may also include SMIS icon 618. In FIG. 6, SMIS icon 618 displays a score of 20. Score 20 may be calculated as described herein. User account 600 may display SMIS icon 618 in response to a selection, by a user operating user account 600, to calculate and display SMIS icon 618. Score 20 may be a low SMIS.

Figure 7:
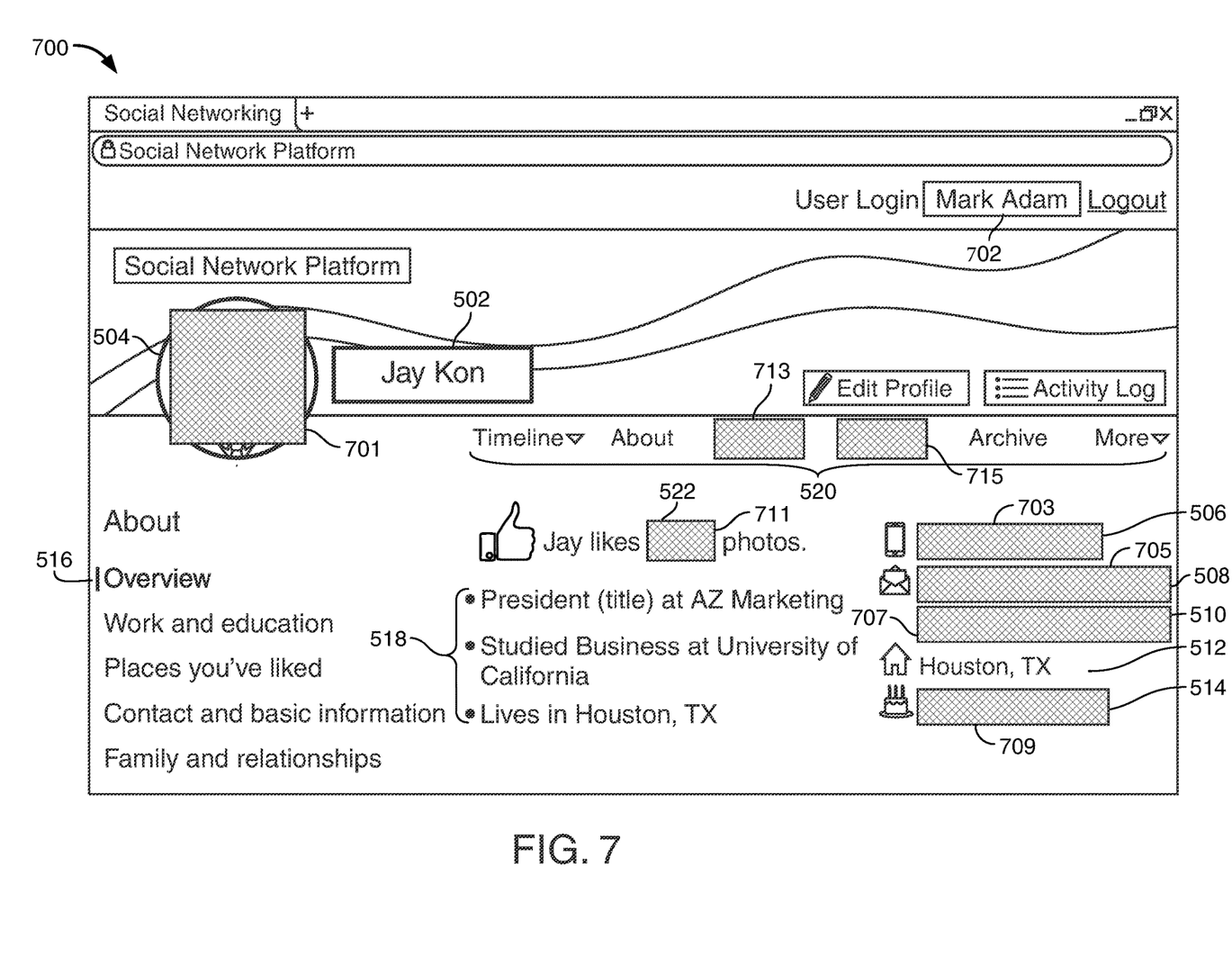
FIG. 7 shows an illustrative diagram in accordance with principles of the disclosure.

FIG. 7 shows user account 500 when it has been accessed by the user of user account 600. Text box 702 shows that Mark Adam, the user of user account 600, has been logged in and is now viewing user account 500.

As discussed in FIG. 6, the user of user account 600 has a very low SMIS. As result, information included in user account 500, and displayed in FIG. 5, may or may not be displayed to the user of user account 600. Specifically, information included in user account 500 that is classified by the systems and methods described herein as being sensitive data included in the second subset of information, may be masked.

As illustrated in FIG. 7, mask 701 may be applied to image 504. Mask 703 may be applied to phone number 506. Mask 705 may be applied to corporate email address 508. Mask 707 may be applied to personal email address 510. Mask 709 may be applied to birthdate 514. Mask 711 may be applied to hyperlink 522. Mask 713 and mask 715 may be applied to some of the selectable tabs 520.

Figure 8:
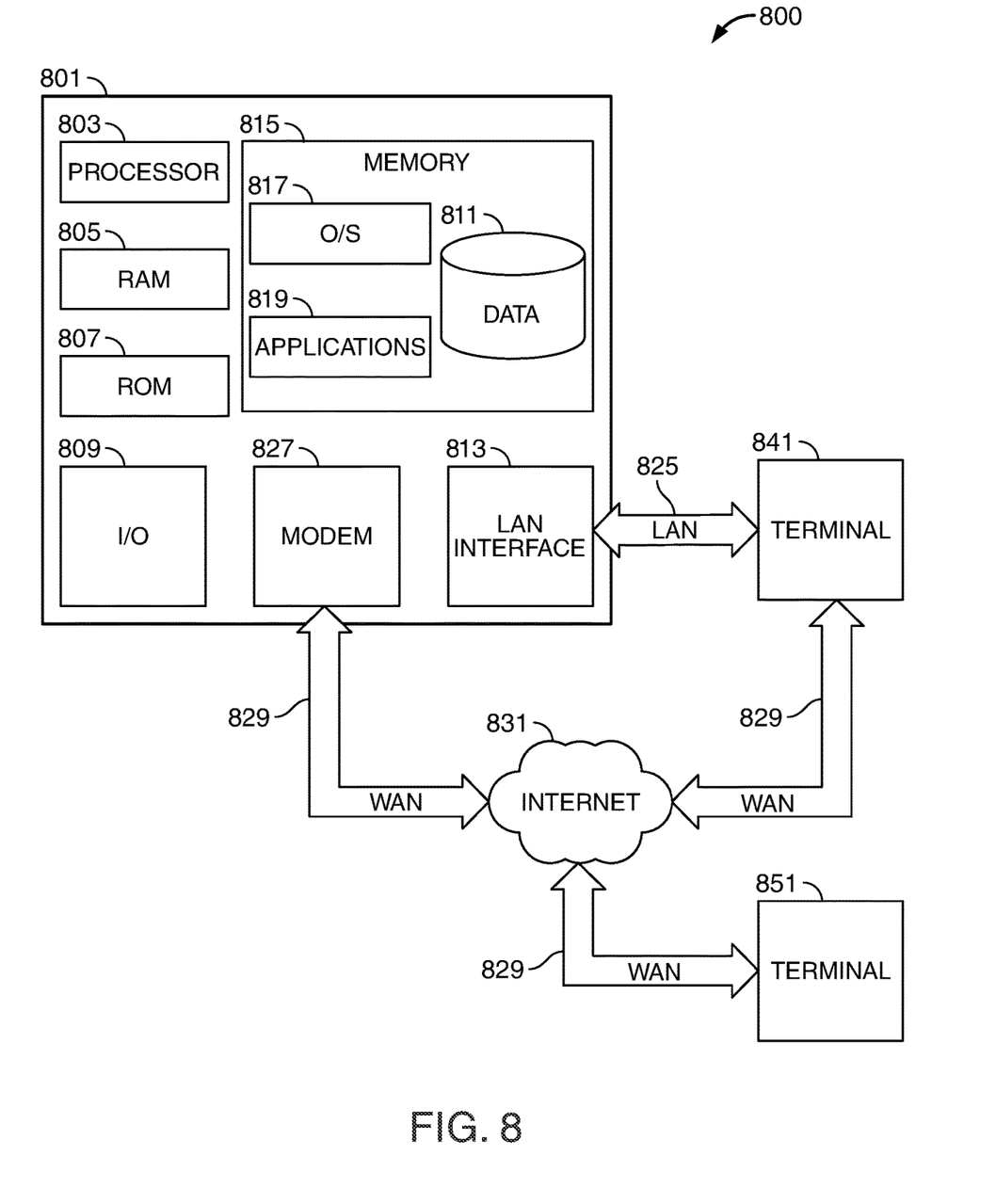
FIG. 8 shows illustrative block diagram of apparatus in accordance with the invention.

FIG. 8 shows an illustrative block diagram of system 800 that includes computer 801. Computer 801 may alternatively be referred to herein as an "engine," "server" or a "computing device." Computer 801 may be a workstation, desktop, laptop, tablet, smart phone, or any other suitable computing device. Elements of system 800, including computer 801, may be used to implement various aspects of the systems and methods disclosed herein. Each of the computing device, the account manager tool, the account validator tool, the web crawler, the account filtering tool, GUI 300, GUI 400, GUI 500, GUI 600, GUI 700, may include some or all of the elements and apparatus of system 800. Furthermore, each of the method steps illustrated in FIGS. 1 and 2, may be performed using one or more of the elements and apparatus of system 800.

Computer 801 may have a processor 803 for controlling the operation of the device and its associated components, and may include RAM 805, ROM 807, input/output circuit 809, and a non-transitory or non-volatile memory 815. Machine-readable memory may be configured to store information in machine-readable data structures. The processor 803 may also execute all software running on the computer—e.g., the operating system and/or voice recognition software. Other components commonly used for computers, such as EEPROM or Flash memory or any other suitable components, may also be part of the computer 801.

The memory 815 may be comprised of any suitable permanent storage technology—e.g., a hard drive. The memory 815 may store software including the operating system 817 and application(s) 819 along with any data 811 needed for the operation of computer 801. Memory 815 may also store videos, text, and/or audio assistance files. The data stored in Memory 815 may also be stored in cache memory, or any other suitable memory.

Input/output ("I/O") module 809 may include connectivity to a microphone, keyboard, touch screen, mouse, and/or stylus through which input may be provided into computer 801. The input may include input relating to cursor movement. The input/output module may also include one or more speakers for providing audio output and a video display device for providing textual, audio, audiovisual, and/or graphical output. The input and output may be related to computer application functionality.

Computer 801 may be connected to other systems via a local area network (LAN) interface 813. Computer 801 may operate in a networked environment supporting connections to one or more remote computers, such as terminals 841 and 851. Terminals 841 and 851 may be personal computers or servers that include many or all of the elements described above relative to computer 801. The network connections depicted in FIG. 8 include a local area network (LAN) 825 and a wide area network (WAN) 829 but may also include other networks. When used in a LAN networking environment, computer 801 is connected to LAN 825 through a LAN interface 813 or an adapter. When used in a WAN networking environment, computer 801 may include a modem 827 or other means for establishing communications over WAN 829, such as Internet 831. Connections between Computer 801 and Terminals 851 and/or 841 may be used for connections between firewall filter 817 and one or more of the GUIs, the computing device, the account manager tool, the account validator tool, the web crawler, the account filtering tool.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 819, which may be used by computer 801, may include computer executable instructions for invoking functionality related to communication, such as e-mail, Short Message Service (SMS), and voice input and speech recognition applications. Application program(s) 819 (which may be alternatively referred to herein as "plugins," "applications," or "apps") may include computer executable instructions for invoking functionality related to performing various tasks. Application programs 819 may utilize one or more algorithms that process received executable instructions, perform power management routines or other suitable tasks. Application programs 819 may utilize one or more decisioning processes used by the account filtering tool for whether or not to mask data being viewed by a social media user with a low SMIS.

Application program(s) 819 may include computer executable instructions (alternatively referred to as "programs"). The computer executable instructions may be embodied in hardware or firmware (not shown). The computer 801 may execute the instructions embodied by the application program(s) 819 to perform various functions.

Application program(s) 819 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 811, and any other suitable information, may be stored in memory 815. One or more of applications 819 may include one or more algorithms that may be used to implement features of the disclosure comprising the assigning of the SMIS and the masking of social media account data.

The invention may be described in the context of computer-executable instructions, such as applications 819, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 801 and/or terminals 841 and 851 may also include various other components, such as a battery, speaker, and/or antennas (not shown). Components of computer system 801 may be linked by a system bus, wirelessly or by other suitable interconnections. Components of computer system 801 may be present on one or more circuit boards. In some embodiments, the components may be integrated into a single chip. The chip may be silicon-based.

Terminal 851 and/or terminal 841 may be portable devices such as a laptop, cell phone, Blackberry™, tablet, smartphone, or any other computing system for receiving, storing, transmitting and/or displaying relevant information. Terminal 851 and/or terminal 841 may be one or more user devices. Terminals 851 and 841 may be identical to computer 801 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 9:
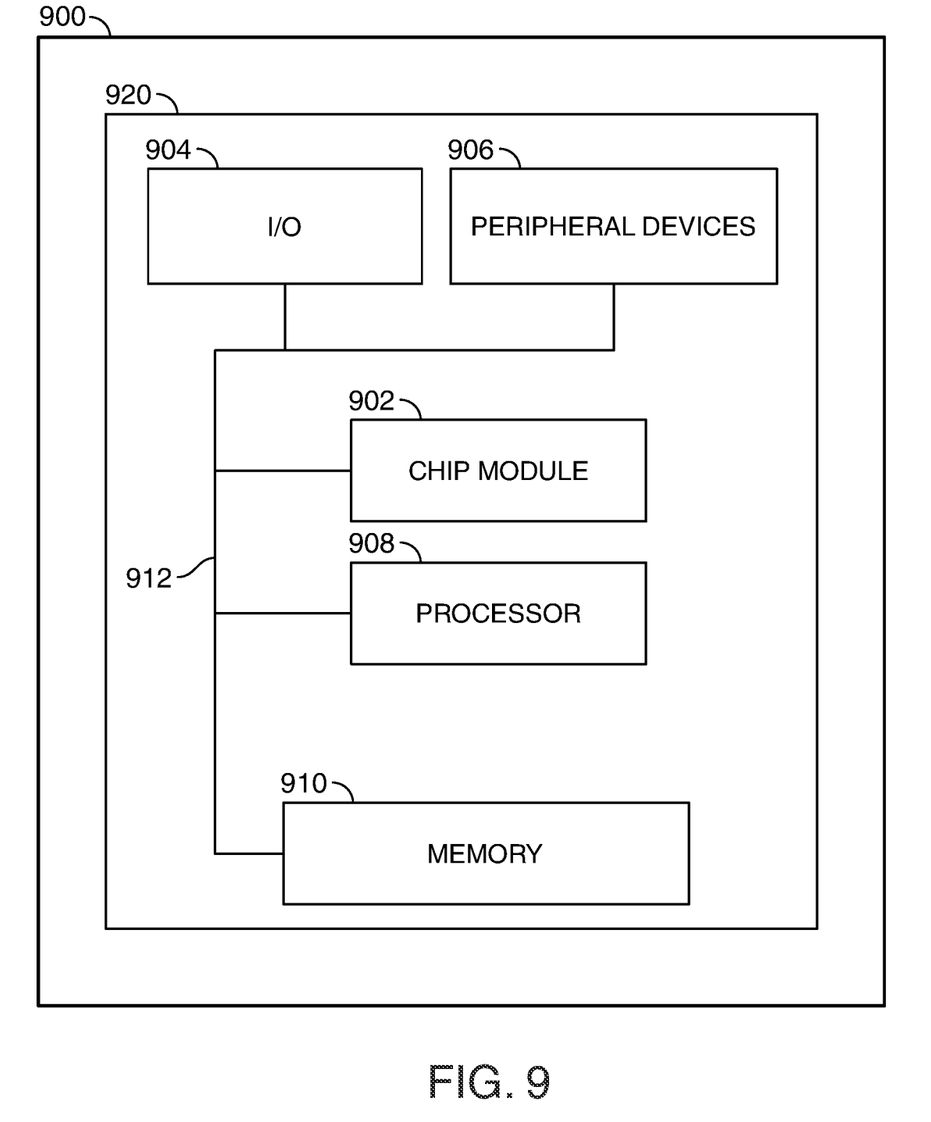
FIG. 9 shows illustrative apparatus that may be configured in accordance with the invention.

FIG. 9 shows illustrative apparatus 900 that may be configured in accordance with the principles of the disclosure. Apparatus 900 may be a computing device. Apparatus 900 may include one or more features of the apparatus shown in FIG. 8. Apparatus 900 may include chip module 902, which may include one or more integrated circuits, and which may include logic configured to perform any other suitable logical operations.

Apparatus 900 may include one or more of the following components: I/O circuitry 904, which may include a transmitter device and a receiver device and may interface with fiber optic cable, coaxial cable, telephone lines, wireless devices, PHY layer hardware, a keypad/display control device or any other suitable media or devices; peripheral devices 906, which may include counter timers, real-time timers, power-on reset generators or any other suitable peripheral devices; logical processing device 908, which may compute data structural information and structural parameters of the data; and machine-readable memory 910.

Machine-readable memory 910 may be configured to store in machine-readable data structures: machine executable instructions, (which may be alternatively referred to herein as "computer instructions" or "computer code"), applications such as applications 819, signals, and/or any other suitable information or data structures.

Components 902, 904, 906, 908 and 910 may be coupled together by a system bus or other interconnections 912 and may be present on one or more circuit boards such as circuit board 920. In some embodiments, the components may be integrated into a single chip. The chip may be silicon-based.

Thus, systems and methods for increasing a data security of information shared and viewed within a social network platform are provided. Persons skilled in the art will appreciate that the present invention can be practiced by other than the described embodiments, which are presented for purposes of illustration rather than of limitation.

What is claimed is:

1. A method for increasing a data security of information shared and viewed within a social network platform, the method comprising: receiving a request to create a first user account on the social network platform, the request including user profile data associated with a first user; creating the first user account based on the user profile data; transmitting a communication to the first user to generate a social media impersonation score ("SMIS"), the SMIS being linked to the first user account, the SMIS indicating a veracity of the user profile data; in response to a receipt of acceptance to generate the SMIS, verifying the veracity of the user profile data, the verifying comprising: determining an authenticity of a corporate email address associated with the first user account by: determining that the corporate email address exists; verifying that a domain associated with the corporate email address is a trusted domain; and executing a two-factor authentication on the first user account, the two-factor authentication using the corporate email address for authentication; generating the SMIS based on results of the verifying; linking the SMIS to the first user account, wherein when the first user account is displayed on a graphical user interface ("GUI") of the social network platform, the SMIS is also displayed on the GUI; and based on the SMIS, filtering data associated with a second user account being displayed to the first user, wherein: when the SMIS is equal to or above a pre-determined threshold value, displaying second user account profile data on the GUI of the social network platform, the second user account profile data comprising a first subset of information and a second subset of information, the first subset of information comprising non-sensitive data and the second subset of information comprising sensitive data; when the SMIS is below the pre-determined threshold value, displaying on the GUI the first subset of information and masking the second subset of information; and when the SMIS is less than a minimum pre-determined threshold value, blocking access to the GUI.

2. The method of claim 1 wherein the verifying of the veracity of the first user profile data further comprises receiving one or more personally identifiable documents from the first user electronically and verifying an authenticity of the one or more personally identifiable documents.

3. The method of claim 2 wherein the one or more personally identifiable documents comprises one or more of a passport, driver's license and social security number.

4. The method of claim 1 further comprising updating the SMIS in real-time, the updating comprising:
executing a web crawler for crawling weblinks on webpages of the domain;
extracting data from the weblinks;
verifying an authenticity of the first user's account by verifying the extracted data; and
based on the verifying, updating the SMIS to reflect the authenticity of the first user account.

5. The method of claim 1 wherein the first user profile data comprises a first name, a last name, a username and a password.

6. The method of claim 1 wherein the user profile data further comprises an employment position.

7. The method of claim 6 wherein the verifying the veracity of the first user profile data further comprises:
receiving one or more documents affirming the employment position; and
verifying an authenticity of the one or more documents.

8. The method of claim 1 further comprising re-verifying the veracity of the first user profile data at pre-determined intervals, the re-verifying comprising at each pre-determined interval:
determining the authenticity of the corporate email address;
executing the two-factor authentication on the first user of the first user account;
re-generating the SMIS based on results of the re-verifying; and
updating the SMIS displayed on the GUI based on the re-generating.

9. The method of claim 1 further comprising when a communication is being transmitted from a second user of the second user account to the first user account, checking the SMIS prior to completing a transmission, wherein:
when the SMIS is at or above the pre-determined threshold value, transmitting the communication directly to the first user; and
when the SMIS is below the pre-determined threshold value, filtering the communication to identify sensitive data included in the communication, and when sensitive data is identified:
masking the sensitive data;
transmitting the communication to the first user account, the communication including the masked sensitive data; and
notifying the second user of the masking.

10. The method of claim 9 further comprising, in response to a request from the second user to unmask the sensitive data, unmasking the sensitive data and resending the communication to the first user.

11. The method of claim 1 wherein the two-factor authentication comprises:

a first-factor authentication including input of a password; and
a second-factor authentication comprising:
receiving a one-time passcode via an electronic communication from the domain associated with the corporate email address;
inputting the one-time passcode at the first user account; and
confirming, via the social network platform, the one-time passcode.

12. The method of claim 1 wherein the sensitive data comprises a personal home address, an email address, an image of a user and hyperlinks to one or more additional personal social media platforms associated with the user.

13. A system for increasing a data security of information shared and viewed within a social network platform, the system comprising: a computing device comprising a processor and memory, the computing device hosting the social network platform; an account manager tool comprising a first set of computer programmable instructions stored in the memory of the computing device and when executed by the processor are configured to: receive a request to create a first user account on the social network platform, the request including user profile data associated with a first user; transmit a communication to the first user to generate a social media impersonation score ("SMIS"), the SMIS being linked to the first user account, the SMIS indicating a veracity of the user profile data; and receive an acceptance communication from the first user account to generate the SMIS; an account validator tool comprising a second set of computer programmable instructions stored in the memory of the computing device and when executed by the processor are configured to in response to a receipt of the acceptance communication, verify the veracity of the user profile data by: determining an authenticity of a corporate email address associated with the first user account, the determining comprising: confirming that the corporate email address is authentic; verifying that a domain associated with the corporate email address is a trusted domain; and executing a two-factor authentication on a first user of the first user account, the two-factor authentication using the corporate email address for authentication; the account validator tool further configured to generate the SMIS based on results of the verifying; the account manager tool configured to link the SMIS to the first user account, wherein when the first user account is displayed on a graphical user interface ("GUI") of the social network platform, the SMIS is also displayed on the GUI; and an account filtering tool comprising a third set of computer programmable instructions stored in the memory of the computing device and when executed by the processor are configured to filter data associated with a second user account being displayed to the first user based on the SMIS of the first user account, the filtering comprising: when the SMIS is equal to or above a pre-determined threshold value, displaying second user account profile data on the GUI, the second user account profile data comprising a first subset of information and a second subset of information, the first subset of information comprising non-sensitive data and the second subset of information comprising sensitive data; when the SMIS is below the pre-determined threshold value, displaying on the GUI the first subset of information and masking the second subset of information; and when the SMIS is less than a minimum pre-determined threshold value, blocking access to the GUI.

14. The system of claim 13 wherein the verifying of the veracity of the first user profile data further comprises a receipt of one or more personally identifiable documents from the first user and verifying an authenticity of the one or more personally identifiable documents.

15. The system of claim 14 wherein the one or more personally identifiable documents comprise one or more of a passport, driver's license and social security number.

16. The system of claim 13 wherein the account validator tool is further configured to update the SMIS in real-time, the updating comprising:
executing a web crawler for crawling weblinks on webpages of the domain;
extracting data from the weblinks;
verifying an authenticity of the first user's account by verifying the extracted data; and
based on the verifying, updating the SMIS to reflect the authenticity of the first user account.

17. The system of claim 13 wherein the linking of the SMIS to the first user account further comprises, linking the SMIS to each email communication transmitted from the first user account by displaying the SMIS in the body of the email communication.

18. A method for increasing a data security of information shared and viewed within a social network platform, the method comprising: receiving a request to create a first user account on the social network platform, the request including user profile data associated with a first user; creating the first user account based on the user profile data; transmitting a communication to the first user to generate a social media impersonation score ("SMIS") score, the SMIS being linked to the first user account, the SMIS indicating a veracity of the user profile data; in response to a receipt of acceptance to generate the SMIS, verifying the veracity of the user profile data, the verifying comprising: determining an authenticity of a corporate email address associated with the first user account by: determining that the corporate email address exists; verifying that a domain associated with the corporate email address is a trusted domain; and executing a two-factor authentication on a first user of the first user account, the two-factor authentication using the corporate email address for authentication; generating the SMIS based on results of the verifying; linking the SMIS to the first user account, wherein when the first user account is displayed on a graphical user interface ("GUI") of the social network platform, the SMIS is also displayed on the GUI; and based on the SMIS, filtering data received from a second user account to the first user account, the filtering comprising: when a communication is being transmitted from the second user account, checking the SMIS prior to completing a transmission, wherein: when the SMIS is at or above a pre-determined threshold value, transmitting the communication directly to the first user account; and when the SMIS is below the pre-determined threshold value, filtering the communication to identify sensitive data included in the communication, and when sensitive data is identified: masking the sensitive data; transmitting the communication to the first user account, the communication including the masked sensitive data; and notifying the second user account of the masking.

19. The method of claim 18 further comprising, in response to a request from the second user account to unmask the sensitive data, unmasking the sensitive data and resending the communication to the first user account.

20. The method of claim 18 wherein the sensitive data comprises an email address, a personal home address and a personal contact phone number.

* * * * *